United States Patent
Van De Sluis et al.

(10) Patent No.: US 10,638,569 B2
(45) Date of Patent: Apr. 28, 2020

(54) LIGHTING MODULE ARRANGED TO BE ATTACHED TO A LUMINAIRE

(71) Applicant: SIGNIFY HOLDING B.V., Eindhoven (NL)

(72) Inventors: Bartel Marinus Van De Sluis, Eindhoven (NL); Dzmitry Viktorovich Aliakseyeu, Eindhoven (NL); Dirk Valentinus René Engelen, Heusden-Zolder (BE); Philip Steven Newton, Waalre (NL); Tim Dekker, Eindhoven (NL); Ramon Antoine Wiro Clout, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/778,493

(22) PCT Filed: Nov. 15, 2016

(86) PCT No.: PCT/EP2016/077713
§ 371 (c)(1),
(2) Date: May 23, 2018

(87) PCT Pub. No.: WO2017/089178
PCT Pub. Date: Jun. 1, 2017

(65) Prior Publication Data
US 2018/0352633 A1    Dec. 6, 2018

(30) Foreign Application Priority Data
Nov. 26, 2016 (EP) .................................. 15196485

(51) Int. Cl.
H05B 37/02 (2006.01)

(52) U.S. Cl.
CPC ..... H05B 37/0227 (2013.01); H05B 37/0254 (2013.01); H05B 37/0272 (2013.01)

(58) Field of Classification Search
CPC .................................................. H05B 37/0272
See application file for complete search history.

(56) References Cited

U.S. PATENT DOCUMENTS

| 7,546,167 | B2 * | 6/2009 | Walters | G06Q 30/04 700/17 |
| 2015/0163867 | A1 | 6/2015 | Recker et al. | |
| 2016/0285309 | A1 * | 9/2016 | Draaijer | H02J 13/0003 |

FOREIGN PATENT DOCUMENTS

| WO | 2010004461 A2 | 1/2010 |
| WO | 2011002280 A1 | 1/2011 |

(Continued)

*Primary Examiner* — Thuy V Tran
(74) *Attorney, Agent, or Firm* — Meenakshy Chakravorty

(57) ABSTRACT

A lighting module (100) arranged to be attached to a luminaire (110) is disclosed. The lighting module (100) comprises at least one light source (102) for rendering a light output, and a processor (104) arranged for determining if the lighting module (100) has been attached to the luminaire (110). The processor (104) is further arranged for setting the lighting module (100) to a first mode of operation if the lighting module (100) has been attached to the luminaire (110), and for setting the lighting module (100) to a second mode of operation if the lighting module (100) has been detached from the luminaire (110). The light output of the at least one light source (102) is controlled dependent on a light setting of the luminaire (110) when the lighting module (100) is in the first mode of operation, and the light output of the at least one light source (102) is controlled independent on the light setting of the luminaire (110) when the lighting module (100) is in the second mode of operation. This enables a user to control the light output of the lighting module (100) when it has been attached to the luminaire (Continued)

(110), for example by controlling the light output of the luminaire (110), and to control the light output of the lighting module (100) when it has been detached from the luminaire (110), for example by interacting with the lighting module (100).

15 Claims, 5 Drawing Sheets

(56) References Cited

FOREIGN PATENT DOCUMENTS

| WO | 2012085742 A1 | 6/2012 |
| WO | 2015049412 A1 | 4/2015 |
| WO | 2015059608 A1 | 4/2015 |
| WO | 2016169789 A1 | 10/2016 |

* cited by examiner

LIGHTING MODULE ARRANGED TO BE ATTACHED TO A LUMINAIRE

CROSS-REFERENCE TO PRIOR APPLICATIONS

This application is the U.S. National Phase application under 35 U.S.C. § 371 of International Application No. PCT/EP2016/077713, filed on Nov. 15, 2016, which claims the benefit of European Patent Application No. 15196485.5, filed on Nov. 26, 2015. These applications are hereby incorporated by reference herein.

FIELD OF THE INVENTION

The invention relates to a lighting module arranged to be attached to a luminaire. The invention further relates to a luminaire for controlling the light output of a light source of a lighting module. The invention further relates to a lighting system. The invention further relates to a method of controlling a light output of a lighting module and to a computer program product for executing the method.

BACKGROUND

Current and future smart lighting devices are already or will be controlled digitally, which provides new control paradigms for such lighting devices. An example of such a smart lighting device is a modular USB luminaire, which comprises sockets arranged for receiving a variety of lamps. A user may for example remove a lamp, which is arranged for providing task lighting, from a first socket of the luminaire and replace this lamp with a lamp arranged for providing ambient lighting.

SUMMARY OF THE INVENTION

It is an object of the present invention to provide a portable lighting device that can be controlled when it is detached from a luminaire.

According to a first aspect of the present invention, the object is achieved by a portable lighting device arranged to be mechanically and electronically attached to a luminaire, the portable lighting device comprising:

at least one light source for rendering a light output, and
a processor arranged for determining if the portable lighting device has been attached to the luminaire, and for setting the portable lighting device to a first mode of operation if the portable lighting device has been attached to the luminaire, wherein the light output of the at least one light source is controlled dependent on a light setting of the luminaire when the portable lighting device is in the first mode of operation, wherein the processor is further arranged for setting the portable lighting device to a second mode of operation if the portable lighting device has been detached from the luminaire, wherein the light output of the at least one light source is controlled independent on the light setting of the luminaire when the portable lighting device is in the second mode of operation.

By setting the mode of operation based on whether the portable lighting device has been attached to the luminaire or not, the processor is able to determine how the portable lighting device is controlled. This enables a user to control the light output of the portable lighting device when it has been attached to the luminaire, for example by controlling the light output of the luminaire, and to control the light output of the portable lighting device when it has been detached from the luminaire, for example by interacting with the portable lighting device. This is advantageous, because it provides flexibility in creating light settings in a room. It is further beneficial, because it enables the user to 'store' one or more portable lighting devices in the luminaire, and to remove them when desired.

In an embodiment of the portable lighting device, the portable lighting device further comprises a user interface arranged for receiving a user input, and the processor is further arranged for controlling the light output of the portable lighting device according to the user input when the portable lighting device is in the second mode of operation. This embodiment is beneficial because it enables a user to provide an input via the user interface and thereby control the light output of the portable lighting device.

Additionally or alternatively, the portable lighting device comprises a user interface arranged for receiving a user input, and the processor is further arranged for generating a lighting control signal based on the user input, and the portable lighting device further comprises a transmitter for transmitting the lighting control signal to the luminaire and/or a further lighting device. This embodiment is beneficial because it enables a user to control the light output of the luminaire and/or the light output of the further lighting device, simply by providing an input via the user interface of the portable lighting device.

In a further embodiment of the portable lighting device, the portable lighting device further comprises a light sensor arranged for detecting light, and the lighting control signal is transmitted if light emitted by the luminaire and/or the further device is detected by the light sensor. In this embodiment, the portable lighting device is arranged for controlling the luminaire and/or the further lighting device if the portable lighting device is located at a location illuminated by the luminaire and/or the further lighting device. The location may, for example, be illuminated by light comprising an embedded code which can be detected by the portable lighting device, thereby enabling the portable lighting device to identify the luminaire and/or further lighting device illuminating the location. This is advantageous, because it enables a user to control the luminaire and/or the further lighting device by simply positioning the portable lighting device in an area which is illuminated by the luminaire and/or the further lighting device.

Additionally or alternatively, the processor is further arranged for determining a proximity between the portable lighting device and the luminaire and/or the further lighting device, and the control signal is transmitted if the portable lighting device and the luminaire and/or the further lighting device are within a predetermined proximity. In this embodiment, the portable lighting device is arranged for controlling the luminaire and/or the further lighting device if the portable lighting device is located at a location within the predetermined proximity of the luminaire and/or the further lighting device. The proximity may, for example, be determined based on the light intensity of light emitted by the luminaire and/or the further lighting device, or be determined based on the received signal strength or the time of flight of signals emitted from the luminaire and received by the portable lighting device. This enables a user to control the luminaire and/or the further lighting device by simply positioning the portable lighting device nearby the luminaire and/or the further lighting device.

In an embodiment of the portable lighting device, the portable lighting device comprises a battery configured to be charged by the luminaire if the portable lighting device has been attached to the luminaire. This embodiment is beneficial because it enables charging of the battery when the portable lighting device has been attached to the luminaire. A user may remove the portable lighting device with a (fully) charged battery, which enables usage of the portable lighting device as a portable lighting device.

Additionally or alternatively, the portable lighting device comprises a battery and a wireless power receiver arranged for charging the battery. This may be beneficial, because it may allow charging of the battery when the lighting device has been detached from the luminaire. Additionally, the luminaire may comprise a wireless power transmitter for charging the battery when the portable lighting device is either attached to or detached from the luminaire.

According to a second aspect of the present invention, the object is achieved by a luminaire for controlling the light output of a light source of a portable lighting device, the luminaire comprising:
- a connector for interfacing with the portable lighting device of any one of the above-mentioned embodiments, and
- a control unit for determining if the portable lighting device has been attached to the luminaire, and for controlling the light output of the at least one light source according to the light setting of the luminaire when the portable lighting device is in the first mode of operation.

The control unit is able to control the portable lighting device when the portable lighting device has been attached to the luminaire. This enables the control unit of the luminaire to create a light effect. If multiple portable lighting devices are connected to the luminaire, or if the luminaire comprises further light sources, the control unit is able to control the portable lighting device(s) accordingly in order to create a desired light effect.

In an embodiment of the luminaire, the luminaire comprises a receiver arranged for receiving lighting control signals from the portable lighting device when the portable lighting device is in the second mode of operation, and the control unit is arranged for setting the light setting of the luminaire based on the received lighting control signal. This enables the luminaire to receive control commands from the portable lighting device, which is beneficial because it may allow a user to control the light output of the luminaire by providing, for example, a user input at the portable lighting device.

In an embodiment of the luminaire, the luminaire comprises a further connector for interfacing with a further portable lighting device, and the control unit is arranged for controlling the light output of the further portable lighting device according to a first light setting if the portable lighting device has been attached to the luminaire and for controlling the light output of the further portable lighting device according to a second light setting if the portable lighting device has been detached from the luminaire. This embodiment enables the luminaire to adjust the light setting of attached portable lighting devices when a portable lighting device has been detached from the luminaire, which may be advantageous because it allows the control unit to, for example, compensate for the detachment of a light emitting portable lighting device (the control unit may for example increase the brightness or beam angle of the attached portable lighting devices to compensate for the detachment).

According to a third aspect of the present invention, the object is achieved by a lighting system comprising:
- a luminaire and a portable lighting device comprising at least one light source, the luminaire and the portable lighting device being arranged to be mechanically and electronically attached to each other, and
- at least one processor arranged for determining if the portable lighting device has been attached to the luminaire, and for setting the portable lighting device to a first mode of operation if the portable lighting device has been attached to the luminaire, wherein the light output of the at least one light source is controlled dependent on a light setting of the luminaire when the portable lighting device is in the first mode of operation, wherein the processor is further arranged for setting the portable lighting device to a second mode of operation if the portable lighting device has been detached from the luminaire, wherein the light output of the at least one light source is controlled independent on the light setting of the luminaire when the portable lighting device is in the second mode of operation.

By setting the mode of operation based on whether the portable lighting device has been attached to the luminaire or not, the at least one processor is able to determine how the portable lighting device is controlled. This enables a user to control the light output of the portable lighting device when it has been attached to the luminaire, for example by controlling the light output of the luminaire, and to control the light output of the portable lighting device when it has been detached from the luminaire, for example by interacting with the portable lighting device. This is advantageous, because it provides flexibility in creating light settings in a room. It is further beneficial, because it enables the user to 'store' one or more portable lighting devices in the luminaire, and to remove them when desired.

In an embodiment of the lighting system, the lighting system comprises a first processor comprised in the luminaire and a second processor comprised in the portable lighting device, wherein the first processor is arranged for controlling the light output of the at least one light source dependent on the light setting of the luminaire when the portable lighting device is in the first mode of operation, and wherein the second processor is arranged for controlling the light output of the at least one light source independent on the light setting of the luminaire when the portable lighting device is in the second mode of operation.

According to a fourth aspect of the present invention, the object is achieved by a method of controlling a light output of a portable lighting device arranged to be mechanically and electronically attached to a luminaire, the method comprising:
- determining if the portable lighting device has been attached to a luminaire,
- setting the portable lighting device to a first mode of operation if the portable lighting device has been attached to the luminaire, or setting the portable lighting device to a second mode of operation if the portable lighting device has been detached from the luminaire,
- controlling the light output of the at least one light source dependent on a light setting of the luminaire when the portable lighting device is in the first mode of operation, or controlling the light output of the at least one light source independent on the light setting of the luminaire when the portable lighting device is in the second mode of operation.

In embodiments of the method, the method further comprises the step of receiving a user input via a user interface, and the step of controlling the light output of the at least one light source independent on the light setting of the luminaire comprises controlling the light output of the portable lighting device according to the user input.

According to a fifth aspect of the present invention, the object is achieved by a computer program product for a computing device, the computer program product comprising computer program code to perform any one of the above-mentioned methods when the computer program product is run on a processing unit of the computing device.

In the context of the present invention the "second mode of operation" (which is activated when the portable lighting device has been removed from the luminaire) is a mode of operation wherein the light source of the portable lighting device is controlled such that it emits light according to a light setting (independent on the light setting of the luminaire).

BRIEF DESCRIPTION OF THE DRAWINGS

The above, as well as additional objects, features and advantages of the disclosed lighting modules, luminaires, lighting systems and methods, will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
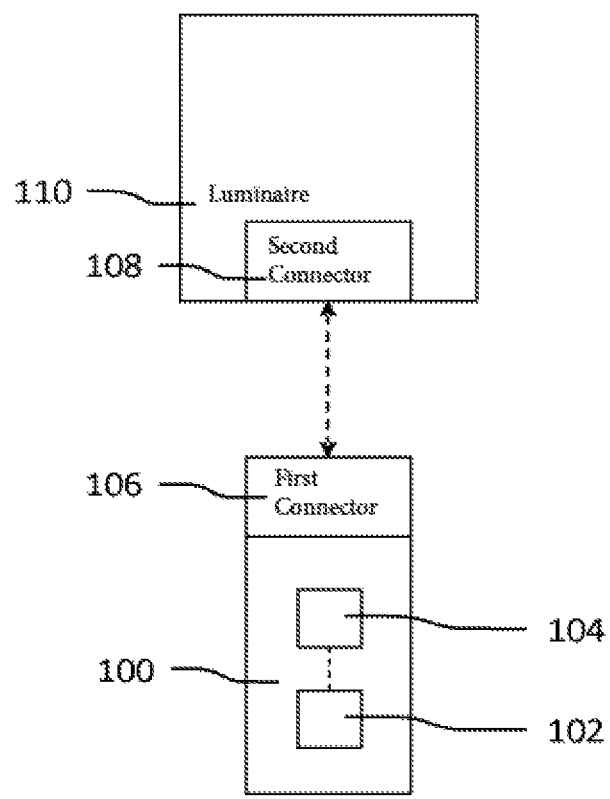
FIG. 1 shows schematically an embodiment of a lighting module according to the invention arranged to be attached to a luminaire.

FIG. 1 shows schematically an embodiment of a lighting module 100 according to the invention arranged to be attached to a luminaire 110. The lighting module 100 comprises at least one light source 102 for rendering a light output, and a processor 104 (e.g. a microcontroller, circuitry, a microchip, etc.) arranged for determining if the lighting module 100 has been attached to the luminaire 110. The processor 104 is further arranged for setting the lighting module 100 to a first mode of operation if the lighting module 100 has been attached to the luminaire 110, and for setting the lighting module 100 to a second mode of operation if the lighting module 100 has been detached from the luminaire 110. The processor 104 may be further arranged for controlling the light output of the at least one light source 102 dependent on a light setting of the luminaire 110 when the lighting module 100 is in the first mode of operation, and for controlling the light output of the at least one light source 102 independent on the light setting of the luminaire 110 when the lighting module 100 is in the second mode of operation. The processor 104 may, for example, be arranged for controlling the hue, saturation, brightness, color temperature, etc. of the lighting module 100.

The processor 104 of the lighting module 100 may receive control instructions from the luminaire 110 for controlling the light output of the at least one light source 102 when the lighting module 100 has been attached to the luminaire 110 (and therefore in the first mode of operation). This enables a control unit (e.g. a microcontroller, circuitry, a microchip, etc.) of the luminaire 110 to create a luminaire dependent light setting. This is advantageous because it allows the user to control the light output of the attached lighting module(s) 100 by controlling the luminaire 110 as one lighting device. The user may, for example, dim the light output of the luminaire 110, whereupon the control unit of the luminaire 110 dims the light output of attached lighting module(s) 100 and, optionally, other light sources (not shown) of the luminaire 110. Upon detaching the lighting module 100 from the luminaire 110, the processor 104 of the lighting module 100 sets the lighting module 100 to the second mode of operation, wherein the processor 104 may receive control instructions any other source (e.g. from via user interface located at or connected to the lighting module 100). The user may, for example, change the color of the light source 102 of the lighting module 104 by providing a user input related to a selection of a color via a user interface (not shown) of the lighting module 100.

The lighting module 100 may further comprise a first connector 106 arranged for interfacing with a second connector 108 of the luminaire 110. This interface (i.e. a connection) allows either one-directional or bidirectional data communication and power transfer from the luminaire 110 to the lighting module 100. The lighting module 100 may, for example, be a USB module and the second connector 108 may be a USB socket for receiving the lighting module 100. A connected USB module may communicate, for example, its idVendor and idProduct (which are standardized USB descriptors) to the luminaire 110, thereby allowing the luminaire 110 to identify (and control) the lighting module 100. The USB module may further communicate its device related properties (such as light emission properties, dimming properties, light colour, beam shape, sensing properties, etc.) to the luminaire 110. The control unit of the luminaire 110 may use these properties for controlling the light source 102 of the lighting module 100 accordingly. The luminaire 110 may comprise a memory for storing the properties of the identified lighting module 100.

The first connector 106 may be any connector arranged for interfacing with the second connector 108 of the luminaire 110. By connecting the lighting module 100 to the second connector 108, the processor 104 is able to determine that the lighting module 100 has been connected to the luminaire 110. The first connector 106 may, for example, be a socket (e.g. a screw socket (E14, E26, E27, etc.), a bayonet socket, a USB socket, a Power over Ethernet socket, etc.) or a plug (e.g. a screw plug (E14, E26, E27, etc.), a bayonet plug, a USB plug, a Power over Ethernet plug, etc.), but it may also be a connector that is arranged for connecting with the luminaire 110 via any other mechanical connection (for example a magnetic connection).

The lighting module 100 comprises at least one light source 102 (e.g. an LED light source, an OLED light source, an incandescent light source, a fluorescent light source, etc.). The lighting module 100 may be arranged for providing general lighting, task lighting, ambient lighting, atmosphere lighting, accent lighting, etc. The lighting module 100 may be a portable lighting device, for example a hand-sized device, such as an LED cube, an electronic candle light, an LED sphere, an object/animal shaped lighting device, a Philips Hue Go, etc. Alternatively, the lighting module 100 may be a wearable lighting device (e.g. a light bracelet, a light necklace, etc.), which can be worn by the user and be charged (and controlled) by the luminaire 110 when it has been attached to the luminaire 110.

The lighting module 100 may further comprise a battery (not shown) arranged for powering the components of the lighting module 100. When the lighting module 100 has been attached to the luminaire 110, the components of the lighting module 100 may be powered by the luminaire 110. The battery may be configured to be charged by the luminaire 110 if the lighting module 100 has been attached to the luminaire 110, and, upon detachment of the lighting module 100, the battery may power the components of the lighting module 100. Additionally or alternatively, the lighting module 100 may further comprise a wireless power receiver arranged for charging the battery. Different wireless power transmission technologies known in the art may be used to enable wireless charging of the battery, for example power transmission via inductive coupling, power transmission via capacitive coupling, power transmission via radio- or microwaves, etc.

Figure 2:
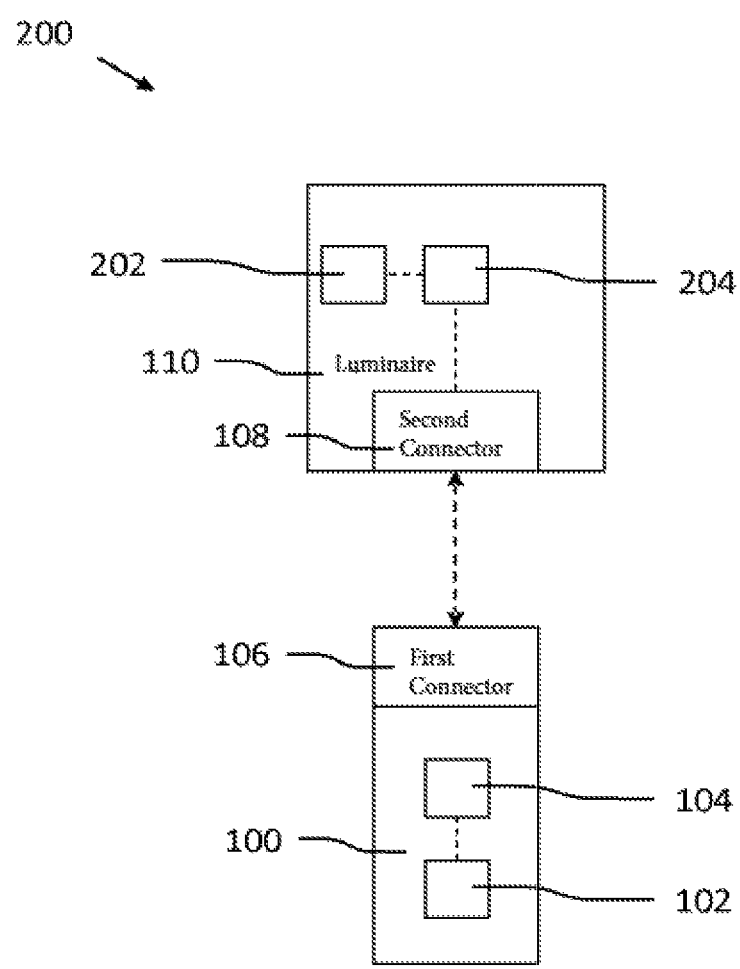
FIG. 2 shows schematically an embodiment of a lighting system according to the invention comprising a lighting module and a luminaire.

FIG. 2 shows schematically an embodiment of a lighting system 200 according to the invention comprising a lighting module 100 and a luminaire 110. The luminaire 110 may be any type of lighting fixture arranged for interfacing with detachable lighting modules 100. The luminaire 110 may for example be a pendant lamp (see FIGS. 3a-4b), a table lamp, a chandelier, an office lamp, a troffer, a portable lighting device, a fixed lighting device, a street lamp, a ceiling lighting fixture, a wall lighting fixture, etc. The luminaire 110 may comprise further light sources which may be controlled by a control unit of the luminaire 110. The lighting system of FIG. 2 further comprises at least one processor, which may be located in the luminaire 110 and/or in the lighting module 100 and/or remote from the lighting module 100 and the luminaire 110 (not shown). The at least one processor is arranged for determining if the lighting module 100 has been attached to the luminaire 110, and for setting the lighting module 100 to a first mode of operation if the lighting module 100 has been attached to the luminaire 110, and for setting the lighting module 100 to a second mode of operation if the lighting module 100 has been detached from the luminaire 110. The lighting system 200 may comprise a first processor 204 comprised in the luminaire 110 and a second processor 104 comprised in the lighting module 100. The first processor 204 may be arranged for controlling the light output of the at least one light source 102 dependent on the light setting of the luminaire 110 when the lighting module 100 is in the first mode of operation. The second processor 104 may be arranged for controlling the light output of the at least one light source 102 independent on the light setting of the luminaire 110 when the lighting module 100 is in the second mode of operation. The luminaire 110 of the lighting system 200 may further comprise a receiver 202 arranged for receiving lighting control signals from the lighting module 100 when the lighting module has been detached from the luminaire 110. This enables a user to control the light output (light setting) of the luminaire 110 by using the lighting module 100 as a remote control device.

The luminaire 110 may further comprise a further connector for interfacing with a further lighting module (not shown in FIG. 2). The control unit 204 (e.g. a microcontroller, circuitry, a microchip, etc.) of the luminaire 110 may be further arranged for controlling the light output of the further lighting module according to a first light setting if the lighting module 100 has been attached to the luminaire 110 and for controlling the light output of the further lighting module according to a second light setting if the lighting module 100 has been detached from the luminaire 110. The control unit 204 of the luminaire 110 may, for example, increase the brightness of the further lighting module upon detachment of the lighting module 100 in order to maintain the overall luminous flux emitted by luminaire 110. In an exemplary embodiment, four (linearly assembled) lighting modules may create a gradient lighting effect (a first lighting module emits red light, a second lighting module orange light, a third lighting module yellow light and a fourth lighting module white light), the control unit 204 of the luminaire 110 may determine to change the light output of any of the attached lighting modules when one or more lighting modules are removed in order to preserve the gradient light effect. When, for example, the first lighting module has been detached from the luminaire, the control unit 204 of the luminaire 110 may control the light output of the second lighting module such that it emits a red light, control the light output of the third lighting module such that it emits a light which is a mix of orange and yellow, and control the light output of the fourth lighting module such that it emits white light. This way, the light effect created by the luminaire 110 before the removal of the first lighting module is preserved.

The lighting module 100 may further comprise a user interface (not shown) arranged for receiving a user input. The processor 104 of the lighting module may be further arranged for controlling the light output of the at least one light source 102 of the lighting module 100 according to the user input when the lighting module 100 has been detached from the luminaire 110. The lighting module 100 may comprise any type of user interface arranged for receiving user input. The user interface may for example comprise a touch-sensitive device such as a touchpad, a touchscreen, one or more buttons and/or one or more sliders for receiving touch input. The touch input may be related to the selection of a color, saturation and/or intensity (e.g. by providing a user input via a color wheel, a color slider, a touch screen displaying different light settings and/or colors, etc.) of the light output of the at least one light source 102 of the lighting module 100. This enables a user to select a light setting for the lighting module 100 simply by, for example, providing a touch input at the user interface of the lighting module 100. Additionally or alternatively, the user interface may comprise an audio sensor, such as a microphone, arranged for detecting sound signals (e.g. voice commands or sound commands), whereupon the light output of the at least one light source 102 is controlled accordingly by the processor 104. This enables a user to select a light setting for the lighting module 100 simply by, for example, providing a sound command for the lighting module 100. Additionally or alternatively, the user interface may comprise a motion sensor such as an accelerometer, magnetometer and/or a gyroscope for detecting movements of the lighting module 100, whereupon the light output of the at least one light source 102 is controlled accordingly by the processor 104. This enables a user to select a light setting for the lighting module 100 simply by, for example, rotating, moving or shaking the lighting module 100. It should be noted that the above-mentioned types of user interfaces illustrate rather than limit the invention, and that a skilled person will be able to design many alternative user interfaces on the lighting module 100 without departing from the scope of the appended claims.

Additionally or alternatively, the lighting module 100 may be controlled by a remote control device, such as a smart device comprising a user interface (e.g. a smartphone, a tablet pc, a smart wearable device such as a smartwatch or smart glasses, etc.) when the lighting module 100 has been detached from the luminaire. A user may, for example, select a light setting for the lighting module 100 on the remote control device, which light setting is communicated (wirelessly) to the lighting module 100. The lighting module 100 may therefore comprise a receiver (not shown) arranged for receiving lighting control commands from the remote control device, which lighting control commands comprise instructions for applying the light setting. Various wireless communication technologies that are known in the art may be used to establish a connection between the remote control device and the lighting module 100, for example Bluetooth, 4G, Wi-Fi or ZigBee. The remote control device may further comprise a display arranged for displaying an application running on the remote control device. The display may provide a virtual representation of the lighting module 100 and or the luminaire 110 to the user, and it may further display the current mode of operation of the lighting module 100. For example, the display may display virtual representations of one or more lighting modules 100 attached to or detached from a virtual representation of a luminaire 110.

The processor 104 of the lighting module 100 may be further arranged for generating a lighting control signal based on the user input. The lighting module 100 may further comprise a transmitter (not shown) for transmitting the lighting control signal to the luminaire 110 and/or a further lighting device. Various wireless communication technologies that are known in the art may be used, for example Bluetooth, 4G, Wi-Fi or ZigBee. This enables a user to control the light output of the luminaire 110 and/or a further lighting device (such as an LED strip, a smart lighting device, another detached lighting module, a stand-alone lighting device, etc.) by providing the user input at the lighting module 100. The user interface of the lighting module 100 may, for example, be any of the above-mentioned user interfaces.

Figure 3A:
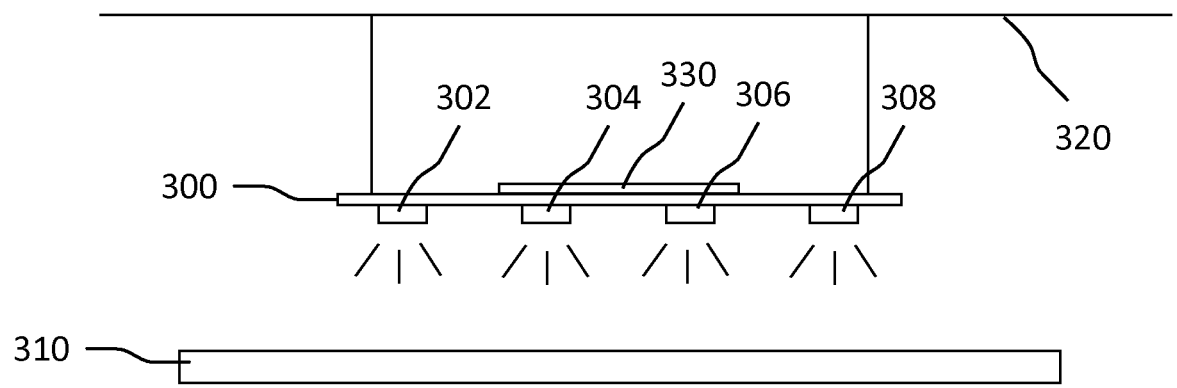
FIGS. 3a and 3b show schematically embodiments of a pendant lamp comprising a plurality of detachable lighting modules and a further light source.
Figure 3B:
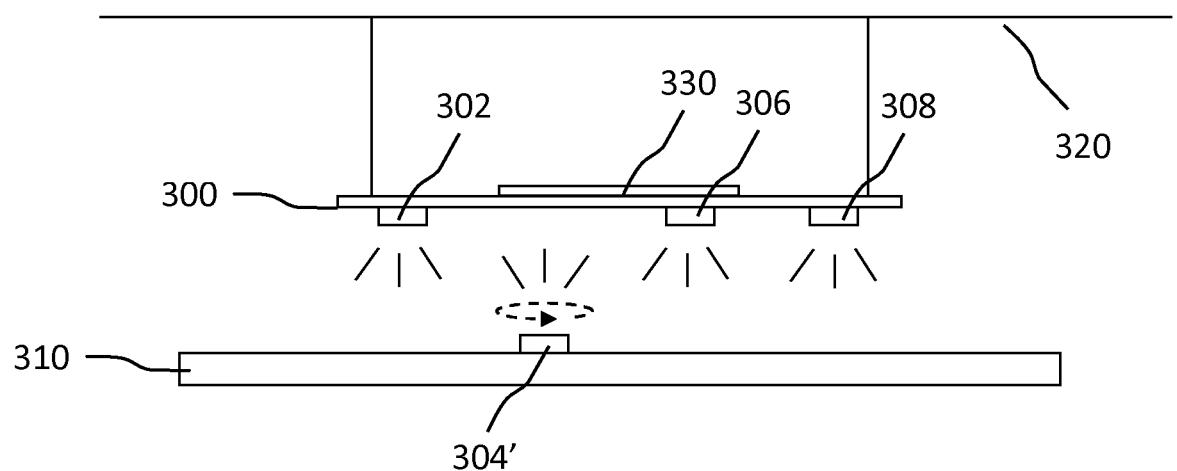

FIGS. 3a and 3b show an example of how a user interface (not shown) of a lighting module 304, 304' may control the light output of at least one light source (not shown) of the lighting module 304' and, optionally, the light setting of the luminaire. FIG. 3a shows a pendant luminaire 300 hanging from the ceiling 320 comprising four lighting modules 302, 304, 306 and 308 illuminating a surface 310. The pendant luminaire 300 may further comprise an additional light source 330 (which may, for example, be arranged for illuminating the ceiling 320). As illustrated in FIG. 3b, a user may detach lighting module 304' from the luminaire 300. Upon detachment of the lighting module 304', the lighting module 304' is set from the first mode of operation (wherein the light output of the at least one light source (not shown) of the lighting module 304 is controlled dependent on a light setting of the luminaire 300) to the second mode of operation (wherein the light output of the at least one light source of the lighting module 304' is controlled independent on a light setting of the luminaire 300). Lighting modules 302, 306 and 308 remain attached to the luminaire 300, and therefore remain in the first mode of operation. When detached, the user may interact with the lighting module 304' in order to control the light output of the at least one light source comprised in the lighting module 304'. In the example of FIG. 3b, the user may rotate the lighting module 304'. One or more sensors (not shown) (e.g. an accelerometer, a magnetometer, etc.) may detect this movement and communicate this to the processor (not shown) which may control the light output according to the movement. The processor may, for example, control the light output according to the colors of the rainbow (red, orange, yellow, green, blue, purple) sequentially when the rotary movement is detected, and set the light output to the color that is being emitted when the user stops the rotary movement.

Additionally or alternatively, the processor (not shown) of the lighting module 304' may be arranged for generating a lighting control signal based on the user input. The lighting module 304' may further comprise a transmitter (not shown) for transmitting the lighting control signal to the luminaire 300. The luminaire 300 may further comprise a receiver (not shown) for receiving the lighting control signal from the lighting module 304', and a control unit (not shown) for controlling the lighting modules 302, 306 and 308 attached to the luminaire (and, optionally, additional light source 330) based on the lighting control signal. The lighting control signal may comprise instructions to adjust, for example, the color, the intensity and/or the saturation of the light output of one or more lighting modules attached to the luminaire. In the example of FIG. 3b, the user may rotate the lighting module 304'. One or more sensors (not shown) (e.g. an accelerometer, a magnetometer, etc.) may detect this movement and communicate this to the processor (not shown) which may generate the lighting control signal, whereupon the lighting control signal is transmitted to the luminaire 300. The processor of the lighting module 304' may, for example, send lighting control signals to the luminaire which control the intensity of the light emitted by the luminaire when the rotary movement is detected, thereby controlling the light output of the light sources (for example the light sources of lighting modules 302, 306 and 308) of the luminaire 300. Once the user stops rotating the lighting module 304' the light setting of the luminaire is set based on the light intensity at the moment the user stops rotating the lighting module'. This example illustrates how a user can control the intensity of the light emission of the luminaire 300, but the skilled person will be able to design many alternative ways of controlling the light output of luminaires 110 by interacting with lighting modules 100 without departing from the scope of the appended claims.

The lighting module 100 may further comprise a light sensor arranged for detecting light emitted by a light source connected to the luminaire 110 (or emitted by a light source of a further lighting device such as an LED strip, an LED matrix, a further detached lighting module, a standalone lighting device, etc.). The light source may be arranged for emitting light comprising an embedded code (a coded light signal), which code may comprise an identifier of the luminaire 110. The embedded code may be created by controlling a time-varying, modulated current to the light source of the luminaire 110 to produce variations in the light output that are detectable by the light sensor, such as a camera, a photoelectric sensor, an image sensor, etc. The light sensor may comprise such a sensor for receiving the light signal, thereby allowing the processor to identify light emitted by the luminaire, and to determine whether the detached lighting module 100 is located at an area illuminated by the luminaire 110. In an embodiment, the processor 104 of the detached lighting module 100 is arranged for transmitting (via a transmitter) the lighting control signal to the luminaire 110 if the lighting module is located in the area illuminated by the luminaire 110. The processor 104 of the lighting module 100 may be configured to not generate or transmit the lighting control signal if the lighting module 100 is not located in the area illuminated by the luminaire 110. This provides the advantage that a user may simply position the lighting module 100 in the illuminated area in order to control the light setting of the luminaire 110, or to position the lighting module 100 outside the illuminated area in order to control, for example, the lighting module's 100 light output.

Figure 4A:
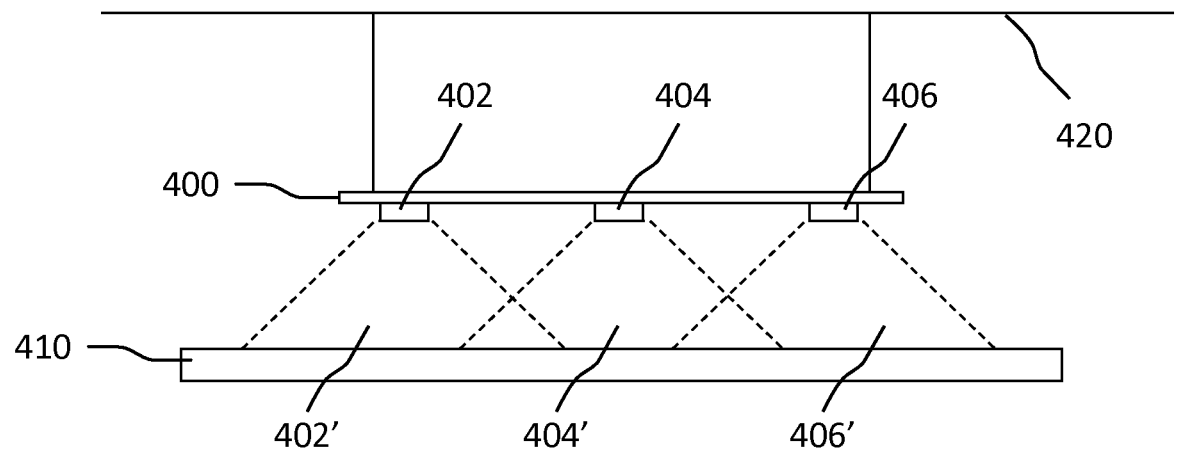
FIGS. 4a and 4b show schematically embodiments of a pendant lamp comprising a plurality of detachable lighting modules.
Figure 4B:
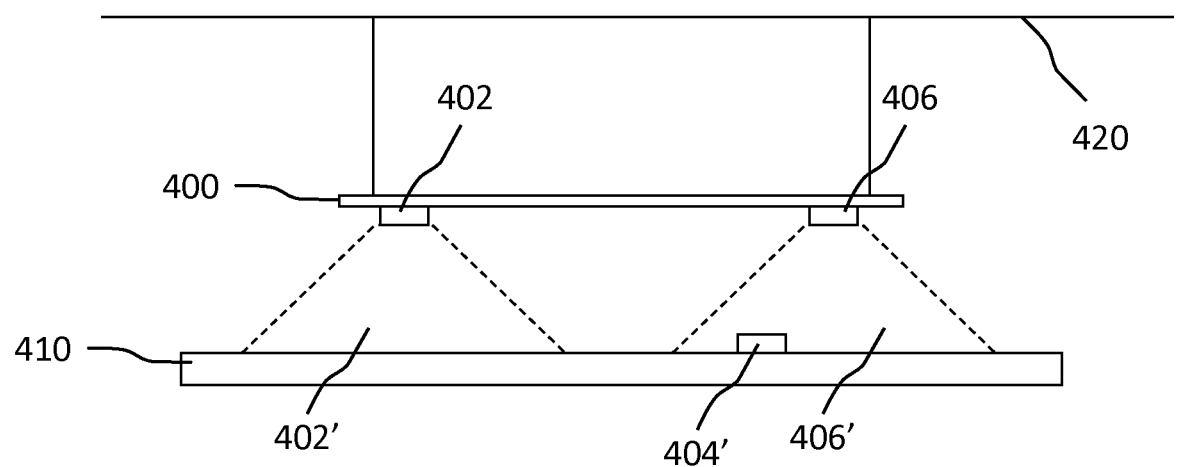

FIGS. 4a and 4b show an example of how a lighting module 404' may control the light setting of the luminaire if the lighting module is within an area (402' and 406') illuminated by light sources (lighting modules 402 and 406, respectively) of the luminaire 400. FIG. 4a shows a pendant luminaire 400 hanging from the ceiling 420 comprising three lighting modules 402, 404 and 406 illuminating a surface 410. As illustrated in FIG. 4b, a user may detach lighting module 404' from the luminaire 400. Upon detachment of the lighting module 404', the lighting module 404' is set from the first mode of operation (wherein the light output of the at least one light source (not shown) of the lighting module 404 is controlled dependent on a light setting of the luminaire 400) to the second mode of operation (wherein the light output of the at least one light source of the lighting module 404' is controlled independent on a light setting of the luminaire 400). Lighting modules 402 and 406 remain attached to the luminaire 400, and therefore remain in the first mode of operation. When detached, the user may interact with the lighting module 404' in order to control the light setting (and therewith the light output of lighting modules 402 and/or 406) of the luminaire 400, if the lighting module 404' is located in an area 402', 406' illuminated by the luminaire 400. In the example of FIG. 4b, the user may provide a user input (e.g. via touch, movement, sound, etc.) via a user interface (not shown) of the lighting module 404', and the lighting module 404' may transmit a lighting control signal to the luminaire 400 if a light sensor (not shown) of the lighting module 404' detects the light emitted by the luminaire 400. In a further embodiment, the lighting module 404' may transmit a lighting control signal to the luminaire 400 that only affects the light output of the light source whose light is detected by the light sensor (in the example of FIG. 4b, the lighting control signal may only affect the light output of lighting module 406, because the lighting module 404' is located in the area illuminated by lighting module 406). If the user would position lighting module 404' outside the area(s) illuminated by the light sources (lighting modules 402 and 406) of the luminaire 400, the processor of the lighting module 404' would not generate or transmit the lighting control signal.

The processor 104 may be further arranged for determining a proximity between the lighting module 100 and the luminaire 110 and/or a further lighting device. In this embodiment, the control signal is transmitted if the lighting module 100 and the luminaire 110 (and/or a further lighting device) are within a predetermined proximity. The lighting module 100 may comprise a receiver for receiving location information of the lighting module 100 and the luminaire 110, in order to determine whether the luminaire 110 is within the predetermined proximity (distance) of the lighting module 100. Additionally or alternatively, the lighting module 100 may comprise a light sensor for detecting a coded light signal emitted by a light source of the luminaire 110. This at least one coded light signal may comprise location/position information about the luminaire 110, thereby enabling the processor 104 to determine a distance (proximity) between the luminaire 110 and the lighting module 100 based on a characteristic of the received coded light signal (e.g. based on the light intensity of the light, the signal/noise ratio of the signal, etc.). Additionally or alternatively, the lighting module 100 may comprise a receiver arranged for receiving signals from the luminaire 110. Reception of these signals, for example radio frequency signals, may allow the processor 104 to determine the distance between the luminaire 110 and the lighting device 100 based on a characteristic of the received signal (e.g. based on the received signal strength, signal time of flight, etc.). It should be noted that the above-mentioned proximity/distance determination techniques are examples of determining proximity between the lighting module 100 and the luminaire 110, and that a person skilled in the art is able to design many alternative proximity/distance determination techniques without departing from the scope of the claims.

Figure 5:
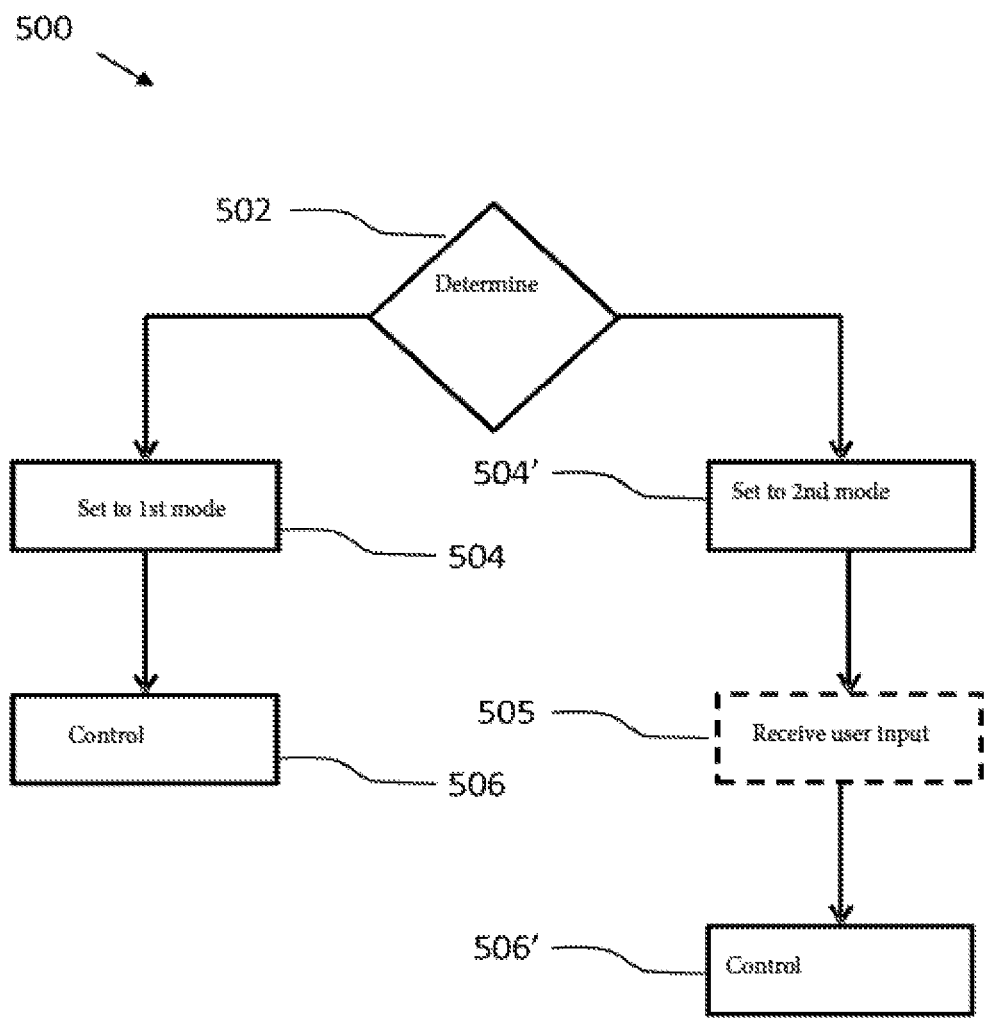
FIG. 5 shows schematically steps of a method according to the invention for controlling a light output of a lighting module.

FIG. 5 shows schematically steps of a method 500 according to the invention for controlling a light output of a lighting module. The method 500 comprises the steps of:

determining 502 if the lighting module has been attached to a luminaire, setting 504 the lighting module to a first mode of operation if the lighting module has been attached to the luminaire, or setting 504' the lighting module to a second mode of operation if the lighting module has been detached from the luminaire, controlling 506 the light output of the at least one light source dependent on a light setting of the luminaire when the lighting module is in the first mode of operation, or controlling 506' the light output of the at least one light source independent on the light setting of the luminaire when the lighting module is in the second mode of operation.

Additionally, the method may comprise the step of receiving 505 a user input via a user interface. The step of controlling 506' the light output of the at least one light source independent on the light setting of the luminaire then comprises controlling the light output of the lighting module according to the user input.

The method may be executed by computer program product for a computing device (for example on the at least one processor of the lighting system of FIG. 2), the computer program product comprising computer program code to perform the method when the computer program product is run on a processing unit of the computing device.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A portable lighting device arranged to be mechanically and electronically attached to a luminaire, the portable lighting device comprising:
   at least one light source for rendering a light output, and
   a processor arranged for determining if the portable lighting device has been attached to the luminaire, and for setting the portable lighting device to a first mode of operation if the portable lighting device has been attached to the luminaire, wherein the light output of the at least one light source is controlled dependent on a light setting of the luminaire when the portable lighting device is in the first mode of operation, wherein the processor is further arranged for setting the portable lighting device to a second mode of operation if the portable lighting device has been detached from the luminaire, wherein the light output of the at least one light source is controlled independent on the light setting of the luminaire when the portable lighting device is in the second mode of operation.

2. The portable lighting device of claim 1 further comprising a user interface arranged for receiving a user input, wherein the processor is further arranged for controlling the light output of the portable lighting device according to the user input when the portable lighting device is in the second mode of operation.

3. The portable lighting device of claim 1 further comprising a user interface arranged for receiving a user input, wherein the processor is further arranged for generating a lighting control signal based on the user input, and wherein the portable lighting device further comprises a transmitter for transmitting the lighting control signal to the luminaire and/or a further lighting device.

4. The portable lighting device of claim 3 further comprising a light sensor arranged for detecting light, wherein the lighting control signal is transmitted if light emitted by the luminaire and/or the further lighting device is detected by the light sensor.

5. The portable lighting device of claim 3, wherein the processor is further arranged for determining a proximity between the portable lighting device and the luminaire and/or the further lighting device, and wherein the control signal is transmitted if the portable lighting device and the luminaire and/or the further lighting device are within a predetermined proximity.

6. The portable lighting device of claim 1 further comprising a battery configured to be charged by the luminaire if the portable lighting device has been attached to the luminaire.

7. The portable lighting device of claim 1 further comprising a battery and a wireless power receiver arranged for charging the battery.

8. An apparatus comprising a luminaire and a portable lighting device, the portable lighting device being mechanically and electronically attached to the luminaire and comprising:
   at least one light source for rendering a light output, and
   a processor arranged for determining if the portable lighting device has been attached to the luminaire, and for setting the portable lighting device to a first mode of operation if the portable lighting device has been attached to the luminaire, wherein the light output of the at least one light source is controlled dependent on a light setting of the luminaire when the portable lighting device is in the first mode of operation,
   wherein the processor is further arranged for setting the portable lighting device to a second mode of operation if the portable lighting device has been detached from the luminaire, wherein the light output of the at least one light source is controlled independent on the light setting of the luminaire when the portable lighting device is in the second mode of operation,
   wherein the luminaire is configured for controlling the light output of the at least one light source of the portable lighting device and comprises:
      a connector for interfacing with the portable lighting device, and
      a control unit for determining if the portable lighting device has been attached to the luminaire, and for controlling the light output of the at least one light source according to the light setting of the luminaire when the portable lighting device is in the first mode of operation.

9. The apparatus of claim 8, wherein the luminaire further comprises a receiver arranged for receiving lighting control signals from the portable lighting device when the portable lighting device is in the second mode of operation, and wherein the control unit is arranged for setting the light setting of the luminaire based on the received lighting control signal.

10. The apparatus of claim 8, wherein the luminaire further comprises a further connector for interfacing with a further portable lighting device, and wherein the control unit is arranged for controlling the light output of the further portable lighting device according to a first light setting if the portable lighting device has been attached to the luminaire and for controlling the light output of the further portable lighting device according to a second light setting if the portable lighting device has been detached from the luminaire.

11. A lighting system comprising:
   a luminaire and a portable lighting device comprising at least one light source, the luminaire and the portable lighting device being arranged to be mechanically and electronically attached to each other, and
   at least one processor arranged for determining if the portable lighting device has been attached to the luminaire, and for setting the portable lighting device to a first mode of operation if the portable lighting device has been attached to the luminaire, wherein the light output of the at least one light source is controlled dependent on a light setting of the luminaire when the portable lighting device is in the first mode of operation, wherein the processor is further arranged for setting the portable lighting device to a second mode of operation if the portable lighting device has been detached from the luminaire, wherein the light output of the at least one light source is controlled independent on the light setting of the luminaire when the portable lighting device is in the second mode of operation.

12. The lighting system of claim 11, wherein the lighting system comprises a first processor comprised in the luminaire and a second processor comprised in the portable lighting device, wherein the first processor is arranged for controlling the light output of the at least one light source dependent on the light setting of the luminaire when the portable lighting device is in the first mode of operation, and wherein the second processor is arranged for controlling the light output of the at least one light source independent on the light setting of the luminaire when the portable lighting device is in the second mode of operation.

13. A method of controlling a light output of a portable lighting device arranged to be mechanically and electronically attached to a luminaire, the method comprising:
  determining if the portable lighting device has been attached to the luminaire,
  setting the portable lighting device to a first mode of operation if the portable lighting device has been attached to the luminaire, or setting the portable lighting device to a second mode of operation if the portable lighting device has been detached from the luminaire,
  controlling the light output of the at least one light source dependent on a light setting of the luminaire when the portable lighting device is in the first mode of operation, or controlling the light output of the at least one light source independent on the light setting of the luminaire when the portable lighting device is in the second mode of operation.

14. The method of claim 13, further comprising the step of receiving a user input via a user interface, and wherein the step of controlling the light output of the at least one light source independent on the light setting of the luminaire comprises controlling the light output of the portable lighting device according to the user input.

15. A non-transitory computer readable medium comprising a computer program product comprising computer program code embodied therewith that, when executed by a processor, causes the processor to perform operations for controlling a light output of a portable lighting device which is arranged to be mechanically and electronically attached to a luminaire, the operations comprising:
  determining if the portable lighting device has been attached to the luminaire,
  setting the portable lighting device to a first mode of operation if the portable lighting device has been attached to the luminaire, or setting the portable lighting device to a second mode of operation if the portable lighting device has been detached from the luminaire, and
  controlling the light output of the at least one light source dependent on a light setting of the luminaire when the portable lighting device is in the first mode of operation, or controlling the light output of the at least one light source independent on the light setting of the luminaire when the portable lighting device is in the second mode of operation.

* * * * *